March 5, 1929. F. JEREMIASSEN 1,704,611
METHOD OF PRECIPITATING SOLID SUBSTANCES IN COARSE
GRANULAR CONDITION FROM SOLUTIONS
Filed Sept. 10, 1925
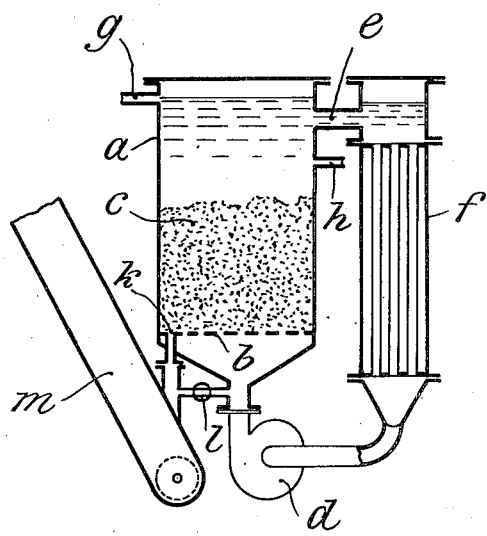
INVENTOR
F. Jeremiassen
By Marks & Clerk
attys Patented Mar. 5, 1929.

1,704,611

UNITED STATES PATENT OFFICE.

FINN JEREMIASSEN, OF OSLO, NORWAY, ASSIGNOR TO AKTIESELSKAPET KRYSTAL, OF OSLO, NORWAY.

METHOD OF PRECIPITATING SOLID SUBSTANCES IN COARSE GRANULAR CONDITION FROM SOLUTIONS.

Application filed September 10, 1925, Serial No. 55,562, and in Norway September 18, 1924.

Lately it is known to produce coarse-granular precipitations by passing a supersaturated solution through a collection of granules of the substance to be precipitated.

The utilization next to hand of this method, if the supersaturation is brought about by cooling, is to force the same quantity of solution again and again through the collection of crystals with a constantly sinking temperature. In the most cases, namely, this recent method has to replace the formerly ordinarily and still very frequently used method consisting in causing the solution to cool slowly in large vessels of crystallization.

But particularly as regards substances having different shape of crystals at different temperatures, this method has a great drawback. For instance, if a solution of ammonium nitrate is saturated at 60° C. and this solution is cooled down to 35°, whereby the dissolved substance is separated out, ammonium nitrate may be separated out as coarser granules. But if the latter are further cooled below 30°, they will turn into powder, because ammonium nitrate has another crystal shape below 30° than at 35°.

It is also formerly known to precipitate substances at a constant temperature by introducing a small quantity of a solution saturated at a higher temperature into a larger quantity of solution maintained at a lower temperature, but without the whole mass being passed through a collection of kernels. This method does not remove the drawback just mentioned. On the contrary, the product is fine-granular already at its creation, and in addition, the cooling surface will take a covering of the precipitations.

The present method does away with these drawbacks and consists in a combination of known elements not hitherto used or published.

1. A suppersaturated solution is forced through a collection of kernels which are to grow.

2. The temperature of the solution is maintained approximately constant.

3. A nearly saturated solution with a higher temperature is added during the process, and a solution, from which the desired quantity of the substance has been precipitated, is removed at the lower, constant temperature existing in the bulk of the solution in the apparatus.

4. The supersaturation of the added solution which shall be forced through the collection of crystals is not brought about directly by a cooling device, but by mixing the added solution with large quantities of solution, from which the desired quantity of substance has been precipitated already and only thereafter the solution is cooled further down by a cooling device.

In the annexed drawing an example of the utilization of the invention is illustrated.

The operation with sinking temperatures in the apparatus further involves the great drawback that the operation becomes intermittent or that the apparatus must be given a complicated construction if continuous operation is to be attained.

The operation takes place in the following manner:

The apparatus is for instance from the beginning filled with a saturated solution of ammonium nitrate with a temperature of 25° C. During the passage of the solution through the cooler $f$, it is cooled down for instance 1/10°. It will thereby be supersaturated and precipitate some ammonium nitrate upon the granules of the collection $c$ when passing through the latter. A portion of the solution passing away through an overflow pipe $g$, whereas through another pipe $h$ nearly saturated solution of ammonium nitrate is introduced with a temperature of 60° C.

When now this introduced brine mixes itself successively with the brine within the apparatus, the mixture will at no time and in no place attain a supersaturation which is higher than the meta-stable one.

The curve of solubility (abcissæ for temperature, ordinates for solubility) of the ammonium nitrate, namely, is curved convexly upwards. While the temperature of the mixture is the arithmetic average of the temperatures of the two brine sorts and the salt quantity per liter of mixed brine is the arithmetic average of the concentration of the two brine sorts, the capability of dissolution of the mixed brines is thus, on account of the convex curve of solubility, higher than the arithmetic average.

The supersaturation is increased by the brine mixture being cooled down 1/10° in the cooler $f$, but also now it does not go beyond the meta-stable limit.

Consequently, only during the passage of the solution through the collection $c$, the supersaturation can be released, what takes place by this that ammonium nitrate is precipitated upon the granules of the collection.

The removal of the granules that have grown into the desired size, takes place through an aperture $k$ in the bottom $b$. Through the cock $l$ an adjustable stream of solution is passed up through the aperture $k$, so that only larger crystals can fall down through $k$ to a conveyor $m$ carrying them away.

As at no moment the collection has a higher temperature than about 25° C, the removed crystals are durable and will not break and turn into powder.

In case of substances having a curve of solubility which is curved concavely upwards, the mixture of the introduced brine and the brine within the apparatus may attain degrees of supersaturation beyond the meta-stable limit, if the introduced brine is just saturated. But this may be easily avoided by introducing it in a somewhat under-saturated condition.

Claims:

The cyclic method of precipitating solid substances from solutions thereof which comprises passing a cooled supersaturated solution of the substance of substantially uniform temperature through a mass of granules thereof, discarding a portion of the solution, adding and mixing a solution of the substance with the remainder of the solution passed through the granules, the added solution having a higher temperature and a higher concentration of substance than the solution to which it is added, cooling the mixed solutions to substantially the aforementioned uniform temperature, reintroducing the cooled mixed solution into contact with the mass of granules whereby the temperature of precipitation is maintained substantially uniform and repeating the cycle.

In testimony that I claim the foregoing as my invention, I have signed my name.

FINN JEREMIASSEN.